March 16, 1954    A. FLEISCHER    2,672,494
NICKEL OXIDE-CARBONYL NICKEL SINTERED PLATES
Filed Jan. 4, 1952
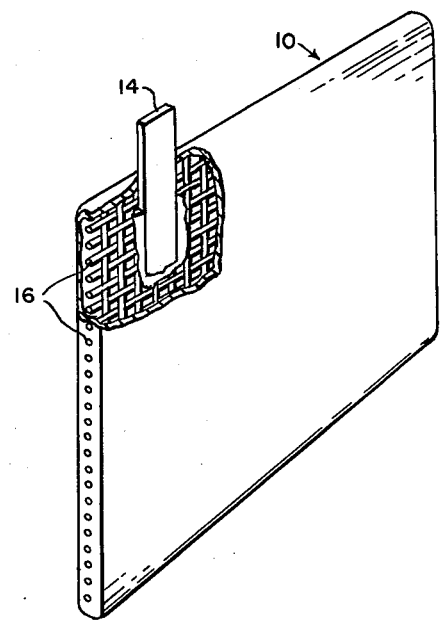
INVENTOR.
ARTHUR FLEISCHER
BY
*Harry M. Saragovitz*
*Attorney*

Patented Mar. 16, 1954

2,672,494

UNITED STATES PATENT OFFICE 2,672,494

NICKEL OXIDE-CARBONYL NICKEL SINTERED PLATES

Arthur Fleischer, Northampton, Mass., assignor to the United States of America as represented by the Secretary of the Army Application January 4, 1952, Serial No. 264,973

8 Claims. (Cl. 136—28)

1

The present invention relates to nickel-cadmium batteries of the sintered plate type and more particularly to an improved plate and method of preparing an improved plate for use in said batteries.

One of the recent advancements in the manufacture of storage batteries of the alkaline type is the development of a sintered plate type nickel-cadmium battery. The positive active material of this battery is a hydrated oxide of trivalent nickel, the negative active material finely divided metallic cadmium, and the electrolyte an aqueous solution of potassium hydroxide. Highly porous plaques sintered from nickel powder, preferably carbonyl nickel powder, are the carriers of the active material. The active material is introduced into the pores of the plaque by a sequence of procedures, the sum of which is called impregnation. The single steps of this procedure are:

(1) The soaking of the plaques in concentrated solutions of nickel or cadmium salts, preferably nitrates;
(2) The precipitation, within the pores of the plaques of the respective hydroxides by a KOH— or NaOH—solution, supported by a cathodic polarization;
(3) The washing out of all soluble products by rinsing the plaques in water, and
(4) The drying of the plaques.

Normally this procedure is repeated at least four times, until the desired amount of the materials is accumulated within the plaques. During a subsequent forming procedure, i. e., repeatedly charging the plate, with intermediate discharge, the initially deposited hydroxides are converted into the active material mentioned above.

The supply of carbonyl nickel powder which is preferably used in the preparation of sintered plaques for use in the plates of nickel-cadmium batteries is, at the present time, not extensive, and substitutes or extenders for said powder have long been sought by research workers within the nickel-cadmium battery industry.

Various substitutes have been used in place of, or in combination with the carbonyl nickel powder; however the majority of said mixtures or substitutes have not proven satisfactory for several reasons. These reasons include high cost, increased fragileness, long sintering time, etc.

An object of this invention is to overcome the above and related disadvantages.

Another object is to produce sintered plaques made from powder mixtures that are indistinguishable from plaques made entirely from carbonyl nickel powder.

A further object of this invention is to produce sintered plaques that are indistinguishable from, and that may be prepared in the usual time, at the usual temperature, and under the usual sintering conditions as employed in producing plaques made entirely from carbonyl nickel powder.

Still another object is to produce a plaque of the type disclosed that will both extend the available carbonyl nickel supply and will also reduce the cost of said plaques.

These and other objects of the present invention will be apparent from the description and claims that follow.

In accordance with the present invention it was discovered that nickel oxide, particularly Nicaro (Cuba) nickel oxide powder (a commercial raw material produced from nickel containing iron ore by a special ammoniacal leaching process) when mixed with carbonyl nickel powder and sintered formed a coherent mass which could be handled and was substantially indistinguishable from a sintered mass of 100% carbonyl nickel powder. The preparation of sintered plaques for use as the plates of nickel-cadmium secondary batteries from mixtures of nickel oxide and carbonyl nickel powder was therefore found to be practicable. When a neutral atmosphere is used, the sintered plaque consists of nickel oxide and nickel. When a reducing atmosphere is used, the sintered plaque consists of metallic nickel. The catalytic effect of the carbonyl nickel on the nickel oxide is unexpected since the nickel oxide is reduced in its presence in an interval of ten minutes compared to a required interval of one hour for complete reduction in the absence of the carbonyl nickel powder. Furthermore plaques prepared from nickel oxide powder only showed no tendency to sinter to form a coherent mass which could be handled. Although the reduced oxide, black in color, could be lifted from the plaque cavity form, the plaque could be reduced to powder by finger pressure and the grid could be easily removed from the reduced cake.

The sintered plaques prepared in accordance with the present invention appear to have the same structure as the plaques made from carbonyl nickel powder only. Impregnation of the plaques is normal without any unusual behavior. The amount of active mass introduced is normal and plate weights are the same order of magnitude as for the straight carbonyl nickel plaques or plates and show no signs of weakness different than those found in straight carbonyl nickel plaques or plates.

The invention will be more readily understood by reference to the appended drawing wherein the figure shows a perspective view of a sintered plate for use in a nickel-cadmium secondary battery comprising a plaque substantially prepared from the powdered mixture of this invention.

In the figure the plate 10 consists of a wire mesh grid 16 to which is affixed an electrical terminal lug 14. All exposed surfaces and the interstices of grid 16 are coated or filled before sintering with the powdered mixture of this invention which mixture comprises nickel oxide powder and carbonyl nickel powder. The surfaces of grid 16, and lug 14, are preferably nickel. The plate 10 before impregnation and with or without lug 14 affixed thereto is herein referred to as a plaque.

The plaques of the present invention are prepared in the same manner as a plaque prepared from straight carbonyl nickel powder. The preferred mixture in accordance herewith is composed of about 50% nickel oxide powder and about 50% carbonyl nickel powder.

Preparation of the plaques in general comprises the steps of:

(1) Providing a wire mesh grid;
(2) Placing said grid within a cavity form;
(3) Filling the interstices and coating the surfaces of the grid with a powdered mixture composed of nickel oxide and carbonyl nickel powder;
(4) Sintering said treated grid for about 10 min. at temperature between about 1650° F. and 1720° F.;
(5) And removing said sintered plaque from said cavity form.

The structure of the grid in itself is not an essential feature of this invention.

As many apparently different embodiments of the invention may be made without departing from the spirit and scope hereof, it is to be understood that the invention is not limited to its specific embodiments except as defined in the appended claims.

What is claimed is:

1. A method of preparing a porous sintered plaque for use as the carrier of active material of a nickel-cadmium secondary battery plate comprising the steps of providing a wire mesh grid, filling the interstices and coating the surfaces of said grid with a mixture comprising nickel oxide powder and carbonyl nickel powder, and sintering said powder treated grid.

2. A method of preparing a porous sintered plaque for use as the carrier of active material of a nickel-cadmium secondary battery plate comprising the steps of providing a wire mesh grid, filling the interstices and coating the surfaces of said grid with a powdered mixture comprising Nicaro nickel oxide powder and carbonyl nickel powder, and sintering said powder treated grid.

3. A method of preparing a porous sintered plaque for use as the carrier of active material of a nickel-cadmium secondary battery plate comprising the steps of providing a wire mesh grid, filling the interstices and coating the surface of said grid with a mixture comprising nickel oxide powder and carbonyl nickel powder, and sintering said powder treated grid for about 10 min. at about 1700° F.

4. A method of preparing a porous sintered plaque for use as the carrier of active material of a nickel-cadmium secondary battery plate comprising the steps of providing a wire mesh grid, filling the interstices and coating the surfaces of said grid with a powdered mixture comprising Nicaro nickel oxide powder and carbonyl nickel powder, and sintering said powder treated grid for about 10 min. at about 1700° F.

5. A method of preparing a porous sintered plaque for use as the carrier of active material of a nickel-cadmium secondary battery plate comprising the steps of providing a wire mesh grid, filling the interstices and coating the surfaces of said grid with a mixture comprising about 50% nickel oxide powder and about 50% carbonyl nickel powder, and sintering said powder treated grid for about 10 min. at about 1700° F.

6. A porous sintered plaque for use as the carrier of active material of a nickel-cadmium secondary battery plate, said plaque being prepared from a powdered sintering mixture substantially comprising nickel oxide and carbonyl equal portions of nickel.

7. A porous sintered plaque for use as the carrier of active material of a nickel-cadmium secondary battery plate, said plaque being prepared from a powdered sintering mixture substantially comprising about 50% nickel oxide powder and about 50% carbonyl nickel powder.

8. A porous sintered plaque for use as the carrier of active material of a nickel-cadmium secondary battery plate, said plaque containing a wire mesh grid and being prepared from a powdered sintering mixture substantially comprising about 50% nickel oxide powder and about 50% carbonyl nickel powder, said mixture filling the interstices and coating the surface of said grid.

ARTHUR FLEISCHER.

References Cited in the file of this patent

UNITED STATES PATENTS

| Number | Name | Date |
| --- | --- | --- |
| 1,306,928 | Sinding-Larsen | June 17, 1919 |
| 1,759,659 | Mittasch | May 20, 1930 |
| 1,988,361 | Thorausch | Jan. 22, 1935 |
| 2,213,128 | Langguth | Aug. 27, 1940 |
| 2,251,913 | Brennan | Aug. 12, 1941 |
| 2,544,112 | Schneider | Mar. 6, 1951 |

FOREIGN PATENTS

| Number | Country | Date |
| --- | --- | --- |
| 653,235 | Great Britain | May 9, 1951 |